United States Patent [19]

Briggs et al.

[11] Patent Number: 5,444,827
[45] Date of Patent: Aug. 22, 1995

[54] METHOD AND APPARATUS FOR PREVENTING PRINT OVERRUNS BY RASTERIZING COMPLEX PAGE STRIPS USING AN INCREASED CLOCK FREQUENCY

[75] Inventors: Randall D. Briggs; Greg L. Allen, both of Boise, Id.

[73] Assignee: Hewlett-Packard Company, Palo Alto, Calif.

[21] Appl. No.: 247,806

[22] Filed: May 23, 1994

[51] Int. Cl.[6] ............................................. G06K 15/00
[52] U.S. Cl. ...................................... 395/115; 395/114; 395/113
[58] Field of Search ..................... 395/113, 115, 114; 364/900

[56] References Cited

U.S. PATENT DOCUMENTS

| | | | |
|---|---|---|---|
| 3,453,601 | 7/1969 | Bogert et al. | 340/172.5 |
| 3,922,526 | 11/1975 | Cochran | 235/152 |
| 3,941,989 | 3/1976 | McLaughlin et al. | 235/156 |
| 4,912,670 | 3/1990 | Hattori | 395/113 |
| 5,109,478 | 4/1992 | Jung | 395/112 |
| 5,129,049 | 7/1992 | Cuzzo et al. | 395/113 |
| 5,218,670 | 6/1993 | Sodek, Jr. et al. | 395/115 |

*Primary Examiner*—Mark R. Powell
*Assistant Examiner*—Steven P. Sax

[57] ABSTRACT

A page printer includes a variable frequency clock for producing at least two clock frequencies, one higher than the other. The page printer includes a first memory for storing a page processing procedure and a second memory for storing data comprising full page strips. A processor operates at the first clock frequency in conjunction with the page processing procedure and derives a rasterization execution time (RET) for display commands that define images to be printed in each page strip of a page. The processor compares the RET for each page strip with a threshold value and rasterizes in the standard manner any page strip whose RET is equal to or less than the threshold value (while operating under the influence of the first clock frequency). When a complex page strip is found (whose RET exceeds the threshold), the variable frequency clock is controlled to generate a second higher frequency clock signal and to cause the processor to operate at a rate determined by the higher clock frequency so that display commands in the complex page strip are rasterized at higher speed.

9 Claims, 3 Drawing Sheets

METHOD AND APPARATUS FOR PREVENTING PRINT OVERRUNS BY RASTERIZING COMPLEX PAGE STRIPS USING AN INCREASED CLOCK FREQUENCY

FIELD OF THE INVENTION

This invention relates to printers, and more particularly,to a method and apparatus for assuring that a constant speed print mechanism has rasterized data awaiting printing.

BACKGROUND OF THE INVENTION

Prior art page printers capture an entire page image before any images are placed on paper. In printers which employ laser engines as the "print mechanism", data must be provided at a speed that is fast enough to keep up with the print action. In such printers, formatting is either performed on the host computer, with large volumes of rasterized image data shipped to the printer at high speed, or on a formatter within the printer itself. Since a laser printer engine operates at a constant speed, if rasterized image data is not available when a previous segment of image data has been imprinted, a "print overrun" occurs and the page is not printable.

Several methods have been used in the prior art to avoid print overruns. First, a full raster bit map of an entire page is stored in the printer so that the print mechanism always has rasterized data awaiting printing. This solution requires large amounts of random access memory for each page. A second method for assuring the availability of print data to a laser printer constructs a display list and builds a page description in two steps. During formatting, a page description received from a host is converted into a series of simple commands, called display commands that describe what must be printed. The display commands are parsed and the described objects are then rendered into a raster bit map. This procedure enables lesser amounts of RAM to be used for the print image.

The prior art has further improved on the second method by sorting display commands according to their vertical position on a page. The page is then divided into sections called page strips, which page strips are then individually rasterized and passed to the print engine for printing. When the display commands are rasterized at a fast enough pace, the same memory used to store a first page strip can be reused for a subsequent page strip further down the page. However, under certain circumstances, certain page strips will include many display commands and require a longer than normal time for rasterization.

In the Laser Jet III printer (manufactured by the assignee hereof) three raster buffers were employed, with the first buffer being reused for a fourth strip on a page, the second reused for a fifth strip, etc. For an eight page per minute printer, little time was left between the finishing of a strip and the time when a next strip would be required from the same print buffer. In the case of a complex strip, rasterization time could increase to such an extent that the succeeding strip could not be delivered on time and a print overrun would occur.

In U.S. Pat. No. 5,129,049 to Cuzzo et al., a page printer is described which addresses the problem created by complex page strips. Cuzzo et al divide each page of text into lateral page strips and allocate a page strip rasterization time to each page strip, based upon the printer's page print time. A rasterization time for each page strip is then calculated, based upon the complexity of the display commands contained within the page strip. If rasterization time for a page strip exceeds the allocated page strip rasterization time, indicating a complex page strip, the page strip is rasterized immediately. Otherwise, the display commands for the page strip are inserted into a queue and are rasterized in order as they are reached. Whenever a complex page strip is reached for processing, its pre-rasterized version is immediately accessed and employed—thereby preventing a print overrun.

One drawback of the Cuzzo et al procedure is that page throughput for the printer is somewhat affected by the prerasterization actions since time must be taken to accomplish prerasterization. This delay, added to other page processing times, causes a limitation on the page printing capability of the printer.

Accordingly, it is an object of this invention to provide an improved method and apparatus for reducing the possibility of print overruns in a constant speed print mechanism.

It is another object of this invention to provide an improved method for preventing print overruns which minimally affects the page throughput capability of a printer.

SUMMARY OF THE INVENTION

A page printer includes a variable frequency clock for producing at least two clock frequencies, one higher than the other. The page printer includes a first memory for storing a page processing procedure and a second memory for storing data comprising full page strips. A processor operates at the first clock frequency in conjunction with the page processing procedure and derives a rasterization execution time (RET) for display commands that define images to be printed in each page strip of a page. The processor compares the RET for each page strip with a threshold value and rasterizes, in a standard manner, any page strip whose RET is equal to or less than the threshold value (while operating under the influence of the first clock frequency). When a complex page strip is found (whose RET exceeds the threshold), the variable frequency clock is controlled to generate the second higher frequency clock signal and to cause the processor to operate at a rate determined by the higher clock frequency so that display commands in the complex page strip are rasterized at higher speed.

DETAILED DESCRIPTION OF THE PREFERRED EMBODIMENTS

Figure 1:
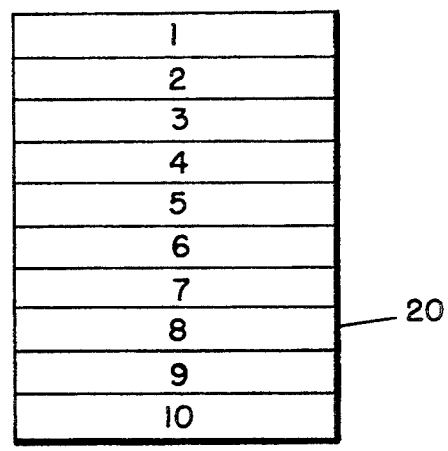
FIG. 1 shows an outline of a page and how it is broken into ten contiguous page strips.

Referring to FIG. 1, a page-printer incorporating the invention treats a page 20 as a series of strips. As an example, ten strips are shown, each one covering a horizontal aspect of page 20. Text, graphics, etc. appearing in any one strip are treated separately during the processing of a page. If it is assumed that the page printer has the capability of producing eight pages per minute, each page will be produced in 7.5 seconds. Since there are ten strips, each strip is arbitrarily allocated a page strip rasterization time (PSRT) of 0.75 seconds. At a gross level, PSRT indicates the available time for processing (i.e., rasterizing) a series of display commands in a page strip. If rasterization occurs within a PSRT, the page printer is able to maintain its specified page print rate. The choice of ten strips is merely exemplary and other page strip allocations are contemplated.

Figure 2:
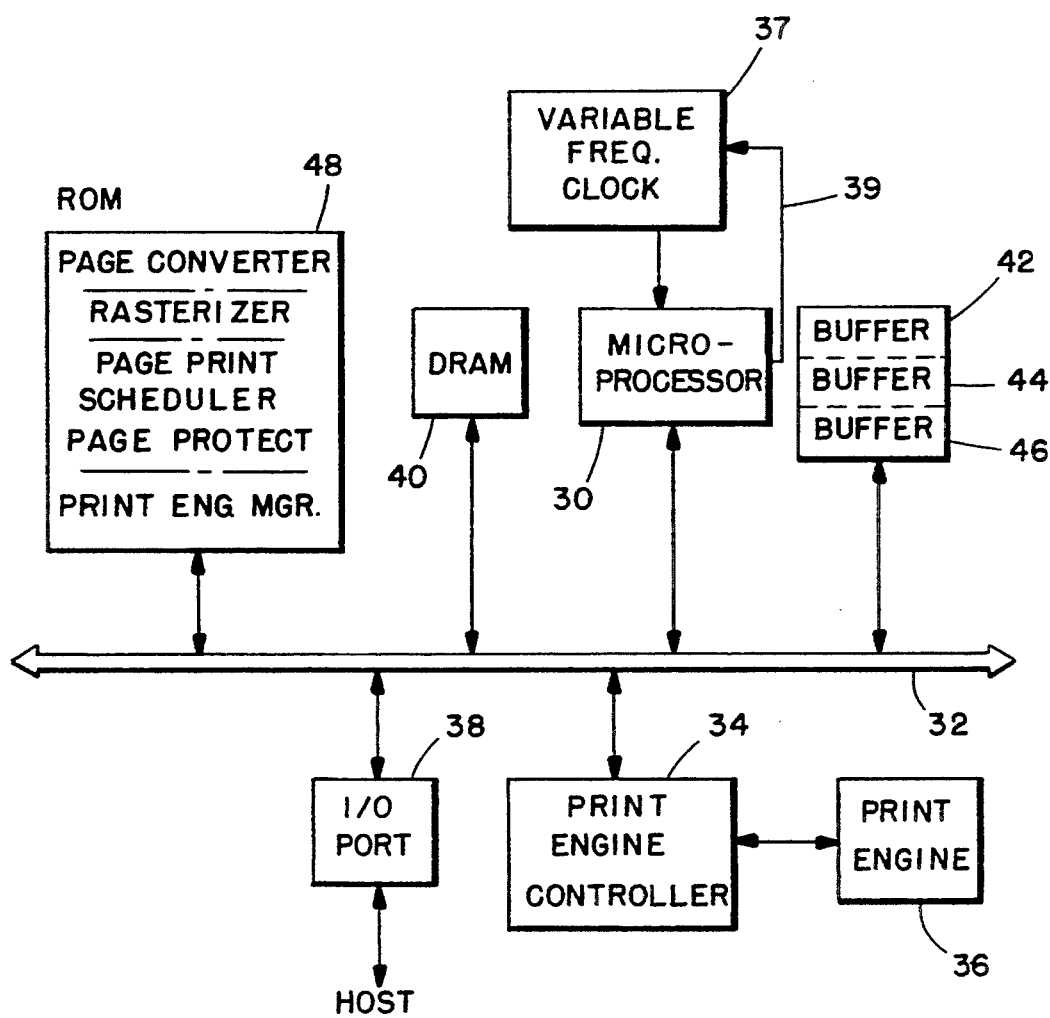
FIG. 2 is a high level block diagram of a printer that embodies the invention.

Turning to FIG. 2, a high level block diagram is shown of a page printer incorporating the invention. The page printer is controlled by a microprocessor 30 which communicates with other elements of the system via bus 32. A print engine controller 34 and associated print engine 36 connect to bus 32 and provide the print output capability for the page printer. Print engine 36 is preferably a laser printer that employs an electrophotography drum imaging system, as well known in the art.

A variable frequency clock (VFC) 37 provides clock signals to microprocessor 30. VFC 37 is operable to selectively apply at least two different clock frequency signals in accordance with a control signal received over line 39. One clock signal occurs at a standard clock frequency that enables continuous operation of microprocessor 30 without overheating. A second clock signal is preferably a multiple of the standard clock frequency and, when applied to microprocessor 30, enables a corresponding speed-up in its processing actions. VFC 37 may comprise a crystal frequency source that feeds a count-down counter which, in turn, provides the clock signal. Feedback on line 39 is used to cause a reduction of the countdown count so as to generate a higher output frequency to the second clock signal. As an alternative, VFC 37 may be configured as a phase locked loop whose frequency is multiplied by an appropriate control signal.

An I/O port 38 provides communications between the page printer and a host computer and receives page descriptions from the host for processing within the page printer., A dynamic random access memory (DRAM) 40 provides random access memory for the page printer. A portion of DRAM 40 (shown separately) includes three, pre-allocated buffers 42, 44 and 46 which are employed during page strip processing.

A read only memory (ROM) 48 holds firmware which controls the operation of the page printer. Among the code procedures stored in ROM 48 is the following: a page converter, rasterizer, page print scheduler (includes a page protect feature) and a print engine manager. The page converter firmware converts a page description received from the host to a display command list. Each display command defines an object to be printed on the page. The rasterizer firmware converts each display command to an appropriate bit map which is passed to print engine 36 by print engine controller 34 and enables the generation of text/graphics etc. The page print scheduler controls the sequencing and transfer of page strip buffers to print engine controller 34. Within the page print scheduler is page protection firmware which assures that print overruns do not occur during the processing of a page. The print engine manager controls the operation of print engine controller 34 and, in turn, print engine 36.

Three page strip buffers 42, 44 and 46 are preallocated. During the print process, each receives a page strip containing display commands, which page strip is then converted to a rasterized image and passed to print engine controller 34 and print engine 36. Only after one of buffers 42, 44 or 46 becomes available, can a new page strip be inserted.

The operation of the page printer shown in FIG. 2 commences when it receives a page description from a host computer via I/O port 38. The page description is placed in DRAM 40 and microprocessor 30 then accesses the page description, line by line, and builds a display command list using the page converter firmware in ROM 48. The display command list is a set of commands that describe what must be printed and forms an intermediate description of the page that will subsequently be converted to a rasterized bit map and utilized by print engine 36. As the display command list is being produced, the display commands are sorted by location on the page and allocated to page strips.

During the time that the page description is being converted to display commands, each command is examined and its rasterization execution time (RET) is found. When the display commands are then positionally sorted and assigned to the various page strips, the RET's for all display commands assigned to each strip are summed to derive a total RET for each strip.

RET is the time needed to render an object from its display command form into a rasterized form. It is known that rasterization time is related to the size of an object and it has been further found that the rasterization time can be found by summing three separate coefficients. The first coefficient is termed "overhead" and is the fixed amount of time microprocessor 30 spends on an object, independent of its size. The second coefficient is "height cost" which is proportional to the object's height, independent of its width. The third coefficient of this sum is termed "word cost" and is proportional to the number of words written to the destination bit map strip, independent of the object's height. The relationship between an object's actual RET and the method of predicting the RET is dependent upon the rasterization algorithm used and the execution speed of the microprocessor. Thus additional coefficients may be deemed useful, dependent upon the specifically used rasterization algorithms.

RET for all objects (e.g., vectors, trapezoids, bit maps) can thus be determined in advance, each with a different set of coefficients. Once the coefficients are determined for various expected objects, they are stored in a table and subsequently accessed when the type and dimensions of an object to be printed become known. Thus, RET for any display command can be readily determined by a table lookup of precalculated coefficients followed by a calculation of the sum of the coefficients, or modified by the objects size.

As can now be seen, during page composition, the page printer computes the size of an object when placing it's display command in the display command list. Given the object's size and its complexity coefficients, the total time needed to render that object into rasterized form is added to the RET of objects already contained within the list. Once page composition is complete, a total RET needed to render the entire display list is known, as is the time required to render each individual page strip.

At this point, the composed page is turned over for printing to a page print scheduler contained in ROM 48. The page print scheduler firmware contains a page protection sub-routine which prevents print overruns as a result of any strip requiring more rasterization time than PSRT.

In brief, the method performed by the system of FIG. 2 identifies any page strip having an RET that exceeds, at the standard clock frequency, the PSRT threshold, (i.e. a complex page strip). When that complex page strip is reached for rasterization, microprocessor 30 causes VFC 37 to increase its clock frequency to the higher second clock frequency. As a result microprocessor 30 rasterizes the complex page strip at a higher speed than is otherwise achievable.

Figure 3:
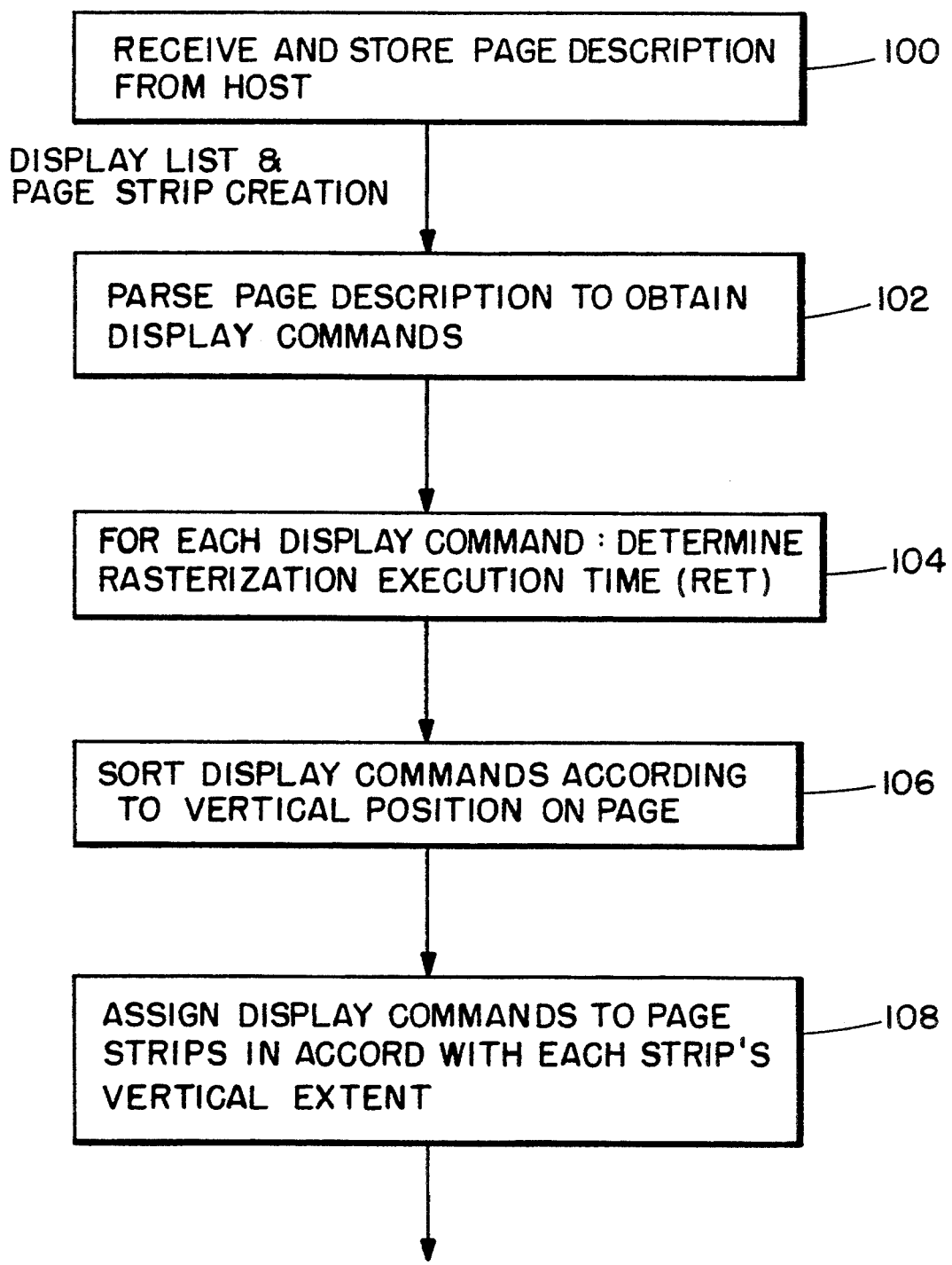
FIGS. 3 and 4 show a high level flow diagram describing the method of the invention.
Figure 4:
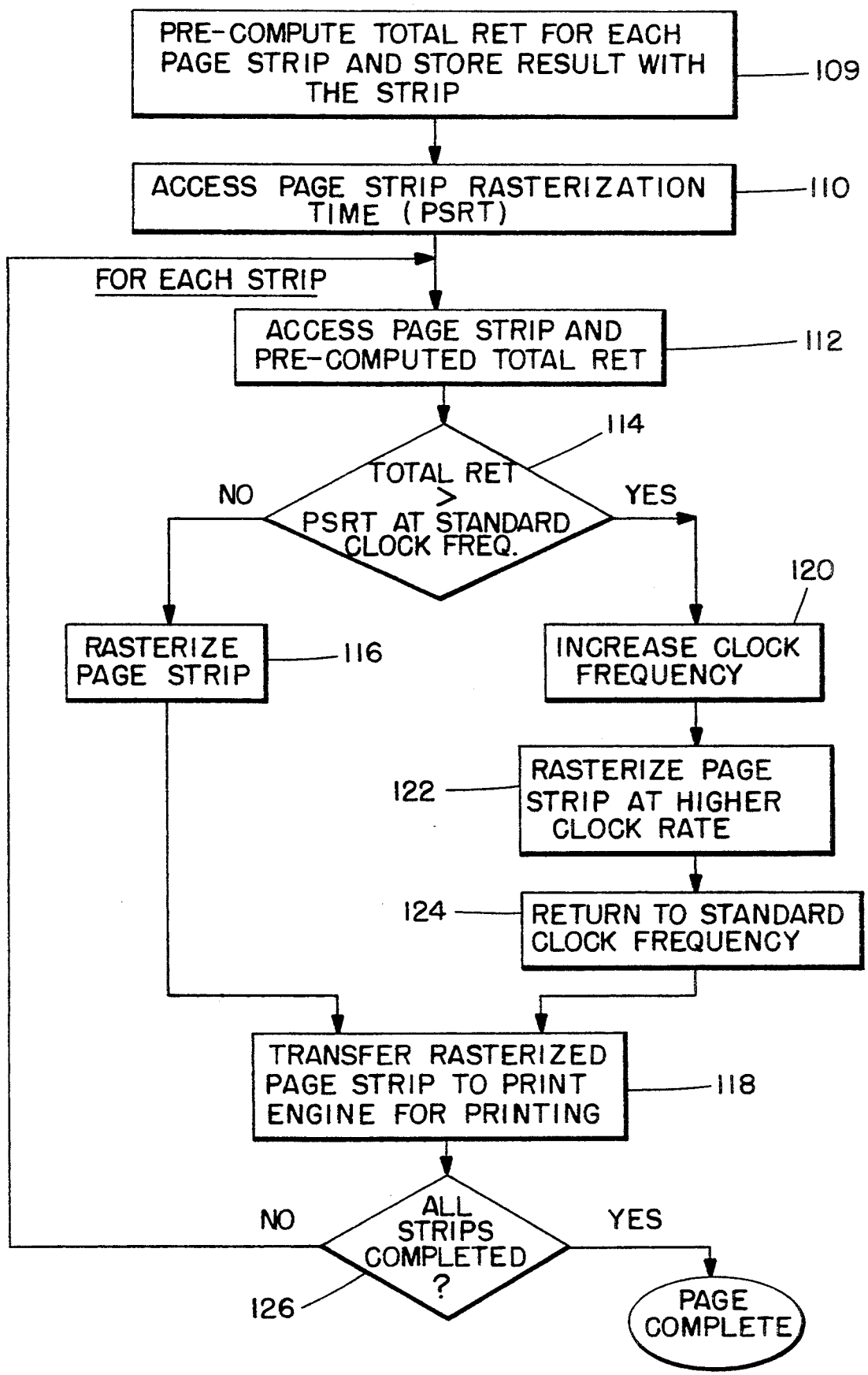

Turning to FIGS. 3 and 4, the operation of the invention will be described in conjunction with the block diagram of FIG. 2. Initially, the page printer receives and stores a page description from the host computer (box 100). Microprocessor 30 then calls the page converter code from ROM 48 that, in turn, parses the page description and creates a display command list (box 102). Each display command is examined and its rasterization execution time (RET) is found (box 104). The display commands are then sorted in accordance with their vertical position on the page (box 106), and assigned to page strips in accordance with each page strip's vertical extent (box 108).

At this stage, the page protection subroutine commences by calculating a total RET for all display commands for each strip (box 109) (see FIG. 4). The page strip rasterization time (PSRT) constant is then accessed (box 110). PSRT may be either precomputed and stored, or calculated by dividing the page print time by the number of page strips. A page strip is then accessed along with its total RET value (box 112).

The total strip RET is then compared to PSRT to determine if its rasterization time exceeds PSRT. If no, the page strip is rasterized by microprocessor 30 using the standard frequency clock output from VFC 37 (box 116). The rasterized page strip is then passed to print engine controller 34 and print engine 36 for printing (box 118). If the total strip RET for the page strip is found to be greater than PSRT at the standard clock frequency (decision box 114), microprocessor 30 emplaces a control potential on line 39 which causes VFC 37 to output the second higher clock frequency. As a result, the processing rate of microprocessor 30 increases (box 120).

The control potential on line 39 increases (for example) the frequency output of VFC 37 by a multiple so that microprocessor 30 experiences a substantial increase in it processing speed. While operating at the higher processing speed, microprocessor rasterizes the complex page strip (122). After the rasterization action on the page strip is completed, VFC 37 is caused to revert to its standard frequency output (box 124) and the rasterized strip is passed to printer engine controller 34 and print engine 36 for printing (box 118). If more strips remain to be processed (decision box 126), the procedure recycles to box 112. Otherwise, the page is finished and the procedure moves to a next page.

In the above manner, microprocessor 30 is enabled to rasterize a complex page strip at a substantially higher rate to thereby prevent a potential page overrun. If the semiconductor chips which comprise microprocessor 30 can only be operated for a certain period of time at the higher second clock rate, then the procedure must be provided with a timing function which prevents the application of the higher frequency clock for a period of time that will cause overheating.

It is possible that the complexity of certain page strips will still exceed the capability of the microprocessor running at the higher frequency to rasterize them fast enough to prevent a print overrun. This situation may be improved by utilizing the pre-rasterization method described in Cuzzo et al. for strips whose complexities exceed the capability of the higher frequency method described herein. By reserving the Cuzzo method for these cases, throughput degradation is minimized.

It should be understood that the foregoing description is only illustrative of the invention. Various alternatives and modifications can be devised by those skilled in the art without departing from the invention. While the invention has been described in a laser printer environment, it is equally applicable to other types of printers which may experience print overrun type problems (e.g. ink jet printers). Accordingly, the present invention is intended to embrace all such alternatives, modifications and variances which fall within the scope of the appended claims.

What is claimed is:

1. A page printer comprising:
   variable frequency clock (VFC) means for producing a first frequency clock signal and a second higher frequency clock signal;
   first memory for storing a page processing procedure;
   second memory for storing display commands allocated to plural page strips, each page strip comprising a portion of a page;
   processor means coupled to said VFC means, first memory and second memory and operational at said first clock frequency in conjunction with said page processing procedure to derive a total rasterization execution time (RET) for said display commands allocated to each said page strip, comparing a total RET for each page strip with a threshold value that is dependent upon a page strip rasterization time, rasterizing display commands allocated to each page strip whose total RET is equal to or less than said threshold value and, for a complex page strip whose total RET exceeds said threshold value, causing said VFC means to generate said second higher frequency clock signal and to operate at a rate determined by said second higher frequency clock signal to rasterize display commands comprising said complex page strip.

2. The page printer as recited in claim 1, wherein said page printer further comprises a laser print engine and said processor means causes said rasterized page strips to be transferred in sequence to said laser print engine.

3. The page printer as recited in claim 2 wherein said processor is only enabled to operate at said rate determined by said second higher frequency clock signal for a limited period of time to prevent an overheating of said processor means.

4. The page printer as recited in claim 2 wherein each said page is divided into plural page strip and each page strip is allocated a page strip rasterization time (PSRT), said threshold value determined from said PSRT.

5. The page printer as recited in claim 4, wherein PSRT is dependent upon a page print time for said page printer.

6. The page printer as recited in claim 1 wherein said second higher frequency clock signal is a multiple of said first frequency clock signal.

7. A method for enabling a page printer to avoid print overruns, said method comprising the steps of:
- converting an input printer language data stream into a display command list;
- allocating display commands to page strips;
- determining a total rasterization time, at a standard clock frequency, for each page strip and display commands allocated thereto; and
- sequentially processing each said page strip to convert display commands allocated thereto into rasterized images, any page strip having a total rasterization time that exceeds a determined threshold value dependent upon a page strip rasterization time being rasterized at a higher speed than page strips having a total rasterization time that is equal to or less than the threshold, said higher speed determined by a second clock frequency that is higher than said standard clock frequency.

8. The method as recited in claim 7 wherein said threshold is further determined based on page strip rasterization time (PSRT) which is determined based upon page print time for said page printer and a number of page strips into which a page is segmented.

9. The method as recited in claim 8, wherein said second clock frequency is enabled only for a limited period of time to prevent overheating of apparatus in said page printer.

* * * * *